United States Patent
Hurwitz

(10) Patent No.: US 7,204,206 B2
(45) Date of Patent: Apr. 17, 2007

(54) ABRASION RESISTANT OMNIDIRECTIONALLY REFLECTIVE PET LEASH

(75) Inventor: Marni Markell Hurwitz, Far Hills, NJ (US)

(73) Assignee: Nite Glow Industries, Inc., Far Hills, NJ (US)

(*) Notice: Subject to any disclaimer, the term of this patent is extended or adjusted under 35 U.S.C. 154(b) by 1 day.

(21) Appl. No.: 11/185,059

(22) Filed: Jul. 20, 2005

(65) Prior Publication Data

US 2006/0027188 A1 Feb. 9, 2006

Related U.S. Application Data

(63) Continuation-in-part of application No. 11/067,442, filed on Feb. 25, 2005, now Pat. No. 6,978,738, which is a continuation of application No. 10/935,687, filed on Sep. 8, 2004, now Pat. No. 6,925,965.

(60) Provisional application No. 60/591,936, filed on Jul. 28, 2004.

(51) Int. Cl.
*A10K 27/00* (2006.01)

(52) U.S. Cl. .................................... 119/795

(58) Field of Classification Search ............ 119/793, 119/795, 769, 858, 797, 798, 859
See application file for complete search history.

(56) References Cited

U.S. PATENT DOCUMENTS

| | | | |
|---|---|---|---|
| 3,176,584 A | 4/1965 | De vries | 359/539 |
| 3,190,178 A | 6/1965 | McKenzie | 359/514 |
| 3,871,336 A | 3/1975 | Bergman | 119/106 |
| 3,999,521 A | 12/1976 | Puiello | 359/518 |
| 4,025,159 A | 5/1977 | McGrath | 359/514 |
| 4,167,156 A | 9/1979 | Kupperman | 119/795 |
| 4,173,201 A | 11/1979 | Chao | 119/859 |
| 4,384,548 A | 5/1983 | Cohn | 359/518 |

(Continued)

FOREIGN PATENT DOCUMENTS

JP 408023814 A * 1/1996

(Continued)

*Primary Examiner*—Son T. Nguyen
(74) *Attorney, Agent, or Firm*—Ernest D Buff & Associates, LLC; Ernest D. Buff; Margaret A. LaCroix

(57) ABSTRACT

A flexible abrasion resistant omnidirectionally reflective pet leash has handle, central pet leash, and pet collar sections that reflect an incoming light beam back in the same direction as it was emanated. The reflected light beam provides accurate illumination of the pet owner's hand, pet leash and the location of the pet during dusk or nighttime hours. This pet leash is created by surrounding a central braided rope of nylon or polyethylene fibers with a cylindrically braided reflective sleeve that is coated with an abrasion resistant transparent polymeric coating. The braided reflective sleeve is composed of narrow width reflective strips that comprise a woven or knitted narrow width strip and a flexible nylon retroreflective sheet sewn thereon. The flexible retroreflective sheet is formed by thermally bonding corner cube, microsphere retroreflectors, or wide angle exposed retroreflective lenses to a flexible polymeric sheet. Due to its braided construction, the reflective pet leash reflects light omnidirectionally over a large angle of acceptance, illuminating the pet owner's hand, the leash itself, and the pet's collar, thereby providing an improved measure of safety for both the pet and the pet handler.

24 Claims, 4 Drawing Sheets

U.S. PATENT DOCUMENTS

| | | | |
|---|---|---|---|
| 4,407,233 A | 10/1983 | Bozzacco | 359/518 |
| 4,513,692 A | 4/1985 | Kuhnsman | 119/797 |
| 4,576,850 A | 3/1986 | Martens | 428/156 |
| 4,582,885 A | 4/1986 | Barber | 528/28 |
| 4,668,558 A | 5/1987 | Barber | 428/156 |
| 4,763,985 A | 8/1988 | Bingham | 359/518 |
| 4,815,818 A | 3/1989 | Thomas | 359/546 |
| 4,887,552 A | 12/1989 | Hayden | 119/793 |
| 4,895,110 A | 1/1990 | LoCascio | 119/859 |
| 4,950,525 A | 8/1990 | Bailey | 428/164 |
| 4,957,335 A | 9/1990 | Kuney | 359/541 |
| 5,046,456 A | 9/1991 | Heyman | 119/859 |
| 5,066,098 A | 11/1991 | Kult | 359/540 |
| 5,117,304 A | 5/1992 | Huang | 359/529 |
| 5,140,946 A | 8/1992 | Pennock | 119/859 |
| 5,200,262 A | 4/1993 | Li | 442/379 |
| 5,237,448 A | 8/1993 | Spencer | 119/792 |
| 5,243,457 A | 9/1993 | Spencer | 119/795 |
| 5,283,101 A | 2/1994 | Li | 428/141 |
| 5,370,082 A | 12/1994 | Wade | 119/859 |
| 5,429,075 A | 7/1995 | Passarella | 119/795 |
| 5,523,927 A | 6/1996 | Gokey | 362/103 |
| 5,535,106 A | 7/1996 | Tangen | 362/108 |
| 5,558,044 A | 9/1996 | Nasser, Jr. | 119/796 |
| 5,630,382 A | 5/1997 | Barbera | 199/859 |
| 5,762,029 A | 6/1998 | DuBois et al. | 119/796 |
| 5,777,790 A | 7/1998 | Nakajima | 359/536 |
| 5,850,807 A | 12/1998 | Keeler | 119/799 |
| 5,882,796 A | 3/1999 | Wilson | 428/411.1 |
| 5,910,858 A | 6/1999 | Frey | 359/534 |
| 5,926,314 A | 7/1999 | Smith | 359/530 |
| 5,962,108 A | 10/1999 | Nestegard | 428/172 |
| 5,967,095 A | 10/1999 | Greves | 119/795 |
| 6,070,556 A | 6/2000 | Edwards | 119/792 |
| 6,159,537 A | 12/2000 | Crandall | 427/163.4 |
| 6,170,968 B1 | 1/2001 | Caswell | 362/469 |
| 6,289,849 B1 | 9/2001 | Macedo | 119/796 |
| 6,557,498 B1 | 5/2003 | Smierciak | 119/858 |
| 6,677,028 B1 | 1/2004 | Lasch | 428/161 |
| 2006/0027188 A1* | 2/2006 | Hurwitz | 119/795 |

FOREIGN PATENT DOCUMENTS

| | | | |
|---|---|---|---|
| JP | 410108576 A | * | 4/1998 |
| JP | 2003307605 A | * | 10/2003 |

* cited by examiner

ABRASION RESISTANT OMNIDIRECTIONALLY REFLECTIVE PET LEASH

CROSS-REFERENCE TO RELATED APPLICATIONS

This application is a continuation-in-part of U.S. application Ser. No. 11/067,442, filed Feb. 25, 2005, now U.S. Pat. No. 6,978,738, which, in turn is a continuation-in-part of U.S. application Ser. No. 10/935,687, now U.S. Pat. No. 6,925,965, filed Sep. 8, 2004 which, in turn, claims the benefit of Application No. 60/591,936, filed Jul. 28, 2004.

BACKGROUND OF THE INVENTION

1. Field of the Invention

The present invention relates to pet leashes; and more particularly, to an abrasion resistant omnidirectionally reflective pet leash especially suited for use during dusk or nighttime hours to enhance safety of pets and their owners while walking in the vicinity of land vehicles.

2. Description of the Prior Art

Walking a pet during dusk or nighttime hours can be hazardous in neighborhoods where automobiles are encountered. Illuminating characteristics of the automobile headlamps, generally afford an illumination range of approximately 25 to 50 feet. This illumination range can be significantly reduced by mist or fog, or bends in the road. Despite improvements to vehicle headlights, pets and their owners are oftentimes not recognized by automobile drivers until the distance between the automobile and the pet is small.

Several approaches devised by prior art workers attempt to provide solutions for this hazardous common activity. These approaches include 1) use of pet collars that are illuminated or reflective; 2) use of leashes which are illuminated or reflective; or 3) a combination of both features. None of these solutions suggest indicating the whereabouts of a pet owner, a leash and a pet attached to the leash via omnidirectional reflection.

Various types of illuminated dog collars using bulb or other powered sources are known in the art. These power-illuminated leashes require batteries, light bulbs or other lighting elements, which are not needed for reflective illumination. Accordingly, a detailed discussion thereof is not required.

U.S. Pat. No. 4,173,201 to Chao, et al. discloses an illuminated collar for pets and the like. U.S. Pat. No. 4,513,692 to Kuhnsman, et al. discloses an illuminated pet leash comprising a non-opaque tube that contains one or more bundles of optical fibers. U.S. Pat. No. 4,895,110 to Lo Cascio discloses a pet collar that includes a light source and a power source attached to a strap. U.S. Pat. No. 4,887,552 to Hayden discloses an electrically lighted pet leash that is composed of a transparent, flexible tube containing a string of small electric light bulbs mounted in parallel between two insulated wires. U.S. Pat. No. 5,046,456 to Heyman, et al. discloses an illuminated pet collar in which multiple lights are mounted within a flexible, light-permeable tube that extends about the perimeter of the collar. A housing mounted on one end of the tube contains a circuit and a battery for operating the lights. U.S. Pat. No. 5,140,946 to Pennock, et al. discloses an illuminated pet collar with miniature lights powered by a battery encased within a flexible, pliable, transparent plastic display tube, which are parallel-wired within the display tube. U.S. Pat. No. 5,370,082, to Wade discloses an animal collar that includes illuminating devices, such as light emitting diodes, liquid quartz strips or electric lamps powered by a plurality of solar cells. U.S. Pat. No. 5,429,075 to Passarella, et al. discloses a pet leash and flashlight combination. U.S. Pat. No. 5,523,927 to Gokey discloses an illuminated animal collar light emitting diode placed on the outer exterior of a collar powered by a battery. U.S. Pat. No. 5,535,106, issued to Tangen, discloses a lighted animal collar that includes a plurality of separate light emitting assemblies, or housings, at spaced intervals along the collar. U.S. Pat. No. 5,558,044 to Nasser, Jr. et al. discloses an illuminating leash handle with a flashlight. U.S. Pat. No. 5,630,382 to Barbera, et al. discloses an illuminated pet harness having straps with internal cavities that contain fiber optic cores illuminated by a light bulb. U.S. Pat. No. 5,762,029 to DuBois, et al. discloses a combined retractable leash and flashlight. U.S. Pat. No. 5,850,807 to Keeler discloses an illuminated pet leash, wherein illumination is remotely activated by a pet owner to locate the leash. U.S. Pat. No. 5,967,095 to Greves discloses an electroluminescence-illuminated pet flat leash strap. U.S. Pat. No. 6,170,968 to Caswell discloses a motion activated rotatable illuminator. U.S. Pat. No. 6,289,849 to Macedo, et al. discloses a device for removably attaching a flashlight to a retractable dog leash. U.S. Pat. No. 6,557,498 to Smierciak, et al. discloses a night safety pet illumination marker, with a pet collar having a series of light emitting diodes mounted around the perimeter of the collar and powered by battery power.

Various types of dog collars illuminated by reflection are known in the art. Representative dog collars of this variety are discussed below.

U.S. Pat. No. 3,871,336 to Bergman discloses a reflective dog collar which is not illuminated; but which utilizes a highly reflective material having the form of different color dots encapsulated in plastic. This illuminates only portions of the flat planar pet collar.

U.S. Pat. No. 3,999,521 to Puiello discloses a reflective safety harness for quadruped animals. The harness includes a pair of identical sheet elements with a light reflective surface mounted on opposite sides of the animal. At the corners of the sheet are fastened straps, which circumscribe the animal's body at the front and rear of the harness. Extending from the front strap, at the top point thereof, midway between the two elements, is a loop through which the dog's regular collar is passed. The arrangement assures immovable attachment of the harness on the dog's body. The disclosure by the '521 patent of a reflective sheet positioned on both sides of the animal does not suggest a pet collar or a leash that reflects incident light.

U.S. Pat. No. 4,167,156 to Kupperman, et al. discloses a reflective animal leather leash. The elongated leather animal leash includes a sewn a transparent polyvinyl chloride strip with a light reflective prism design on one surface. The light reflective prism is bonded by dielectric heat sealing or sonic welding to an opaque polyvinyl chloride strip sewn to the leather strip, resulting in a leash having a light reflective surface. Since the strip has a reflective surface on only one side of the leash, it does not reflect light in every direction. The flat leather leash is not easily twistable and is not readily bent without separating the transparent and opaque polyvinyl chloride layers.

U.S. Pat. No. 4,384,548 to Cohn discloses a safety device for animals. A pet collar uses "retro-reflective" threads with glass reflective elements in a flexible webbing to form a pet leash. The threads are said to reflect incident light directly back toward the source. Disposition of reflective threads in the webbing forming the collar is sparce. As a result, the quantum of incident light reflected is small; and an insignificant quantum of incident light is reflected back to the source.

U.S. Pat. No. 4,407,233 to Bozzaco discloses a safety collar for pets. The collar has highly reflective flexible elements with a length large enough to extend beyond the outer surface of the pet's hair. It uses flexible elements with Scotchlite reflecting strips attached to a collar. A reflective pet leash is not disclosed, and the flexible elements do not reflect light in every direction.

U.S. Pat. No. 5,243,457 to Spencer discloses a material with enhanced visibility characteristics. This flexible visibility enhancing material combines the advantages of a light reflective component and a luminescent component. The material includes a first layer of prismatic light reflective plastic material having an underlying surface formed with a plurality of minute prism-like formations projecting there from at regular spaced intervals, and an overlying substantially smooth light transmissive surface. Bonded, i.e. by heat-sealing, to the first layer is a second layer of plastic luminescent material. The second layer is contiguously and integrally attached to the underlying surface of the prism-like formations and generally coextensive therewith. The visibility enhancing material simultaneously radiates luminescent light from the second layer through the underlying surface of prism-like formations and through the smooth light transmissive surface and reflects light from the prism-like formations through the smooth light transmissive surface. In one embodiment, a leash for controlling and restraining a pet animal includes a flexible elongate member comprised of the visibility enhanced material. In another embodiment, the second layer is replaced with a layer of luminescent material, which can be selectively energized to become luminous. Since the transparent reflective material is a molded plastic of prismatic construction it is rigid and is not flexible and does not form a leash that is capable of being twisted and bent. Further any twisting and bending action separates the reflective element from the luminescent element.

U.S. Pat. No. 5,237,448 to Spencer, et al. discloses a visibility enhancing material. The flexible visibility enhancing material combines the advantages of a light reflective component and a luminescent component. The material includes a first layer of prismatic light reflective plastic material having an underlying surface formed with a plurality of minute prism-like formations projecting therefrom at regular spaced intervals, and an overlying substantially smooth light transmissive surface. A second layer of plastic luminescent material is contiguously and integrally attached to the underlying surface of the prism-like formations and generally coextensive therewith. The visibility enhancing material simultaneously radiates luminescent light from the second layer through the underlying surface of the prism-like formations and through the smooth light transmissive surface, and reflects light from the prism-like formations through the smooth light transmissive surface. In one embodiment, a leash for controlling and restraining a pet animal includes a flexible elongate member comprised of the visibility enhanced material. Since the transparent reflective material is a molded plastic of prismatic construction, it is rigid and is not flexible and does not form a leash that is capable of being twisted and bent. Furthermore, any twisting and bending action will result in separation of the reflective element from the luminescent element.

U.S. Pat. No. 6,070,556 to Edwards discloses an illuminating dog safety system. This illuminating dog safety system is designed for allowing an animal to be more visible at night. The device includes a collar that is worn around a neck of an animal. The collar has a reflective strip extending a majority of its length. A harness is provided that is adapted to be worn around a torso of the animal. The harness is comprised of an upper strap member, a lower strap member, and a longitudinal extension there between. The upper strap member, the lower strap member, and the longitudinal extension each have a reflective strip extending a majority of a length thereof. A leash is provided that is adapted for securement to the collar. The leash has a reflective strip extending a majority of its length. All these strip elements are made from flat elements, as shown in FIG. 3 of the patent disclosure. Twisting the elements does not provide the reflectivity needed for adequate visibility at night.

Numerous patents disclose reflective materials. Some of these patents disclose reflective elements having corner cube shapes embedded in a rigid or flexible polymeric strips and monolayers of spherical beads, i.e. primarily glass beads bonded to a reflective sheet.

U.S. Pat. No. 3,176,584 to DeVries, et al. discloses that a reinforcing layer may be incorporated into an embedded lens retroreflective sheeting. The reinforcing layer may be of a similar composition as the binder in which the microspheres are embedded. The layer may be applied to the back side of the secularly reflective layer via spraying, i.e., by a solvent-coating technique. Examples of the reinforcing layer materials disclosed include methyl methacrylate, flexible epoxy resins, chloro-sulfonated polyethylene, polystyrene, polypropylene, polycarbonate resin, ethyl cellulose, and cellulose acetate-butyrate. The reflective layer is typically very thin and fragile, i.e. in the order of 0.06 microns thick, and must be disposed in special relationship to the microspheres in order for the sheeting to provide useful retroreflection.

U.S. Pat. No. 3,190,178 to McKenzie discloses a reflex reflective sheeting. It uses a monolayer of microspheres embedded in a polymer to reflect the incoming light beam in the same direction as the incident beam. Since the sheet is formed by melting of the polymeric binder, it is rigid and therefore unsuitable for flexible pet leashes.

U.S. Pat. No. 4,025,159 to McGrath discloses cellular retroreflective sheeting. The cellular retroreflective sheeting comprises a base layer of retroreflective elements and a transparent cover film supported in spaced relation away from the base layer by a network of narrow intersecting bonds. These bonds form hermetically sealed cells within which retroreflective elements are isolated from retroreflective elements of different cells. The resultant sheeting achieves greater durability through use of bonds that are cured in situ after they have been thermoformed into sealing contact between the cover film and base layer. The base material is coated with the binder, subjected to heat and pressure to displace the binder around the embedded microsphers or corner cubes forming the bonded network. Retroreflective articles so constructed may be rigid and inflexible.

U.S. Pat. No. 4,576,850 to Martens, and U.S. Pat Nos. 4,582,885, 4,668,558 to Barber disclose a shaped plastic articles having replicated microstructure surfaces. This shaped plastic article is made by crosslinked polymer with hard and soft segments having a microstructure-bearing surface that is replicated, with a castable fluid, and radiation hardened. Articles formed by this process exhibit, a retroreflective cube-corner sheeting, Fresnel lens or video disc.

All these formed articles are rigid and therefore unsuitable for use in pet leashes. Moreover, these articles also exhibit low tear strength.

U.S. Pat. No. 4,763,985 to Bingham discloses a launderable retroreflective applique that comprises a layer of transparent microspheres, a specular reflective layer optically connected to each microsphere, and a binder layer into which the microspheres are partially embedded. Resins disclosed as being suitable for use as binder layers include polyurethane, polyesters, polyvinyl acetate, polyvinyl chloride, acrylics, or combinations thereof. The specular reflective layers are composed of two succeeding layers of dielectric material. The layers have varying refractive indices and are composed of a variety of binary metal compounds including oxides, sulfides, and fluorides.

U.S. Pat. No. 4,815,818 to Thomas discloses three-dimensional flexible reflectors. The reflector is provided with elastomeric resilient member with a plurality of embedded retro-reflective glass beads. A portion of the outer surface of the elastomeric material is removed to expose the glass beads. The exterior surface of the glass beads at the outer surface is exposed and is subject to abrasion.

U.S. Pat. No. 4,950,525 to Bailey discloses elastomeric retroreflective sheeting. The elastomeric retroreflective sheeting has a monolayer of non-stretchable microspheres. These microspheres are embedded in a sheet with a spacing layer of transparent elestomeric material underlying the back surface of the microspheres. A cover layer of transparent elastomeric material covers the front surface of the microspheres. A specularly reflective layer is disposed on the back surface of the spacing layer. The cover layer comprises a clear thermoplastic elastomeric aliphatic polyurethane.

U.S. Pat. No. 4,957,335 to Kuney discloses microsphere-based retro-reflective articles having high retroreflective brightness at narrow divergence or observation angles, i.e. up to 0.5 degrees. The article is made by selection of microspheres having defined combinations of average diameter and average refractive index. This patent teaches (column 4, lines 18–23) that variation in the size of the microspheres will increase the observation angle or divergence angle of the resultant retro-reflective article.

U.S. Pat. No. 5,066,098 to Kult, et al. discloses cellular encapsulated-lens high whiteness retroreflective sheeting with a flexible cover sheet. This cellular, encapsulated-lens retroreflective sheeting comprises a base sheet of a monolayer of retroreflective elements that is partially embedded in a binder layer which typically is white. A cover sheet is disposed in spaced relation from the layer of retroreflective elements. A network of narrow intersecting bonds, or seal legs, that extend between the cover sheet and the base sheet with binder material are thermoformed at the point of contact between the base sheet and cover sheet. Such a rigid, reflective sheet is unsuitable for pet leashes, which require structures that can twist and flex.

U.S. Pat. No. 5,117,304 to Huang, et al. discloses a retroreflective article. The retroreflective article has corner cubes and is flexible, and can be applied over irregular surfaces by using an optically clear, aliphatic polyurethane polymer. The aliphatic polymer has a plurality of hard chain segments having the formula —C(O)N(H)—$C_6H_{10}$—N(H)C(O)—.

U.S. Pat. No. 5,200,262 to Li discloses a launderable retroreflective appliqué. The appliqué employs a reflector that comprises elemental aluminum or elemental silver on the backside of the microspheres. The appliqué comprises a monolayer of metal-coated microspheres partially embedded in and partially protruding from a binder layer. The binder layer comprises a flexible polymer having hydrogen functionalities and one or more isocyanate-functional silane coupling agents. The disclosed flexible polymers that possess hydrogen functionalities are crosslinked, flexible urethane-based polymers, such as isocyanate-cured polymers or one or two component polyurethanes and polyols.

U.S. Pat. No. 5,283,101 to Li discloses a launderable retroreflective appliqué comprising a binder layer formed from an electron-beam curable polymer and typically one or more crosslinkers and silane coupling agents. Electron-beam curable polymers include chlorosulfonated polyethylenes, ethylene copolymers comprising at least about 70 weight percent of polyethylene, such as ethylene/vinyl acetate, ethylene/acrylate, and ethylene/acrylic acid, and poly(ethylene-co-propylene-co-diene) polymers. Glass microspheres are embedded in the cured binder layer, and a specular reflective metal layer is disposed on the embedded portions thereof. When the appliqué is inverted, light comes through the binder layer.

U.S. Pat. No. 5,777,790 to Nakajima discloses a microsphere-based retroreflective article. The retroreflective article comprises a monolayer of microspheres partially embedded in and protruding from a binder layer and specular reflector underlying the microspheres. The monolayer of microspheres comprises a mixture of a first class of microspheres having a first refractive index and a second class of microspheres having a second refractive index. The second refractive index is higher than the first refractive index. As a result, the sheeting exhibits superior observation angle angularity.

U.S. Pat. No. 5,882,796 to Wilson, et al. discloses bonded structured retroreflective sheeting. The structured retroreflective sheeting includes an array of corner cube structured retroreflective elements, a thermoplastic sealing film located proximate the structured elements, and bonding agent between the sealing film and the structured retroreflective elements. The bonding agent bonds the sealing film to the structured retroreflective film. This bonded structure is rigid and is unlikely to survive the flexing and twisting movements of a pet leash.

U.S. Pat. No. 5,926,314 to Smith, et al. discloses a retroreflective cube corner article having scalene base triangles. The cube corner retroreflective article exhibits a wide range of retroreflective entrance angularity in at least one plane, and preferably in two or more planes. The structured surface has an array of cube corner elements formed by three intersecting sets of substantially parallel grooves. Each cube corner element includes a base triangle bonded by one groove from each of the three intersecting groove sets, the base triangle being scalene. The corner cube reflector is rigid and cannot be used for producing reflective leashes.

U.S. Pat. No. 5,962,108 to Nestegard, et al. discloses a retroreflective polymer coated flexible fabric material and method of manufacture. The retroreflective polymeric coated flexible fabric material has a retroreflective layer and a polymeric compatibilizing layer welded to a polymeric coated outer surface of a flexible fabric material. The compatibilizing layer provides an intermediate layer between the retroreflective layer and the flexible fabric material, creating suitable bond strength between dissimilar polymers. Flexible fabric materials are polyester, nylon or cotton. The fabric is coated with highly plasticized polyvinyl chloride (PVC) or ethylene acrylic acid copolymer (EAA). These polymers are flexible, durable, and resistant to abrasion. The retroreflective prismatic elements layer includes: acrylic polymers, such as poly(methylmethacrylate); polycarbonates; cellulosics; polyesters such as poly(butyleneterephthalate); poly(ethyleneterephthalate); fluoropolymers; polyamides; polyetherketones; poly(etherimide); polyolefins; poly(styrene); poly(styrene) co-polymers; polysulfone; urethanes, including aliphatic and aromatic polyurethanes; and mixtures of the above polymers such as a poly(ester) and poly(carbonate) blend, and a fluoropolymer and acrylic polymer blend. The compatibilizing layer that is suitable for bonding between a retroreflective layer and a flexible fabric material include: polyurethane, ethylene methyl acrylate copolymer, ethylene N-butyl acrylate copolymer, ethylene ethyl acrylate copolymer, ethylene vinyl acetate copolymer, polymerically plasticized PVC, and polyurethane primed ethylene acrylic acid copolymer. Such a reflective fabric does not suggest the shape, construction or function of a pet leash.

U.S. Pat. No. 5,910,858 to Frey discloses retroreflective sheeting with a coated back surface. The retroreflective sheet has a plurality of indentations on the back surface to reflect the light, and a transparent front surface to encapsulate and protect the light reflecting indentations. This reflective sheet is rigid and is unsuitable for use in pet leashes.

U.S. Pat. No. 6,159,537 to Crandall discloses a method of making a retroreflective article that has a binder layer containing an epoxy resin and silicone crosslinked polymer. A pre-binder composition comprises about 5 to about 40 parts of an epoxy resin. About 60 to about 95 parts of an alkoxysilane terminated polymer is applied to a retroreflective layer and then cured to form a binder layer that is adhered to the retroreflective layer and an article of clothing. The binder composition does not cover the exterior surface of the reflective layer and does not provide abrasion resistance.

U.S. Pat. No. 6,677,028 to Lasch, et al. discloses retroreflective articles having multilayer films and methods of manufacturing same. These retroreflective articles have multilayer films and are useful for commercial graphics and retroreflective products, such as roll-up signs for highway transportation safety. The articles comprise multilayer films having at least one layer of polyurethane and a core layer of a copolymer of alkylene and a bond layer of non-acidic, polar co-monomer including, ethylene copolymer, vinyl acetate, acrylate, EVA, acid-modified EVA, anhydride-modified EVA, acid-acrylate-modified EVA, anhydride-acrylate-modified EVA, EEA, EMA, AEA, EVACO, EBACO, and EnBA. The glass retroreflective beads comprise an air-exposed portion or have an overlay polyurethane or EAA cover film. When retroreflective glass beads are exposed to air, they are subject to wear.

Notwithstanding the efforts of prior art workers to construct pet leashes and pet collars that are illuminated by incident light, there remains a need in the art for a flexible abrasion resistant pet leash that omnidirectionally reflects a significant quantum of incoming light back to its source. Numerous methods for producing retroreflectors have been disclosed. A flexible pet leash having a robust construction that withstands tensile and torsional forces attending leash usage, has long been needed in the art. Also needed is a flexible, omnidirectional abrasion resistant pet leash capable of maintaining high reflectivity when subjected to surface abrasion from frictional forces created by contact of the leash with objects having rough exteriors, such as the ground, flooring, posts, trees and the like.

SUMMARY OF THE INVENTION

The present invention provides a pet leash that is abrasion resistant and omnidirectionally reflective. Omnidirectional reflectivity is provided by the incorporation of retroreflective corner cube reflectors or microsphere reflective elements thermally bonded onto a nylon mesh strip to form a flexible nylon retroreflective sheet, which is in turn sewn onto a narrow width reflective strip. With this structure, the leash reflects a significant quantum of the incident light from a car head light or other light emitting element back to the source. The abrasion resistance property of the pet leash is provided by a transparent coating. One such coating comprises a polymer that is transparent, flexible and has a refractive index significantly smaller than that of the retroreflective elements used. Abrasion resistance and omnidirectional reflectivity is achieved by: a) creating a flexible retroreflective sheet comprising a plurality of corner cube reflectors bonded via a transparent bond to a flexible polymeric sheet, or several microspheres bonded via a transparent bond to a reflectorized flexible polymeric sheet; b) producing a narrow width strip composed of nylon or polypropylene fibers by knitting, weaving or braiding, to achieve a strip width in the range of 0.0065 inch to 0.25 inch, depending upon the size of the central cylindrical rope core; c) thermally bonding a flexible retroreflective sheet onto a nylon mesh strip to form a flexible nylon retroreflective sheet which is in turn sewn onto a show surface of the narrow width strip, thereby forming a narrow width reflective strip; d) cylindrically braiding, at a shallow braid angle, three or more narrow width reflective strips to surround and cover the external surface of a central cylindrical leash core made from braided nylon or polypropylene fibers; e) forming a cylindrical retroreflective braided sleeve integrally surrounding a central cylindrical leash core to thereby create a leash having an external retroreflector surface; and f) coating the external surface of the cylindrical retroreflective braided sleeve with a transparent, flexible abrasion resistant coating having a refractive index significantly less than that of the retroreflective elements. The thickness of the transparent abrasion resistant coating is in the range of 0.002 to 0.010 inches.

The proximal end of the leash is formed into a loop that defines a leash handle. The retroreflective cylindrical braiding sleeve present on the handle is seamlessly braided, closing the loop. Thus the handle also reflects the incident light from a car's headlights back to the source illuminating the position of the hand that is holding the pet. The distal end of the leash is attached to mechanical hardware, such as a metallic ring, forming a choke collar that encircles the neck of the pet creating a retroreflective collar. In a second embodiment, the distal end of the leash has an adjustable metallic strip with one or more holes locations that lock with a pet leash clamp forming a reflective pet collar that is non-choking. The transparent abrasion resistant coating may be applied to the entire length of the pet leash between the proximal and distal ends.

The cylindrical character of the flexible cylindrical braided sleeve reflects a significant quantum of incident light back to the source effectively since some portion of the braided sleeve is always at angles close to normality and most of the braided cylindrical sleeve falls within the reflecting angular range of the retroreflectors. The shallow braiding angle of the cylindrical braid sleeve lays the thermally bonded narrow width strips at a shallow angle with respect to the length of the cylindrical central core. As a result the leash can be readily flexed or twisted due to the relative movement provided within the cylindrical braid sleeve structure. The flexibility of the transparent abrasion resistant coating provides for flexing and twisting movement of the abrasion resistant pet leash without coating separation or delamination.

The external surface of the cylindrical retroreflective braided sleeve is coated with a transparent, flexible abrasion resistant polymeric coating. The coating has a refractive index significantly lesser than that of retroreflective elements. Typically the retroreflective elements have a refractive index of 1.9 to 2.2 and the flexible transparent abrasion resistant polymeric coating has a refractive index of 1.3 to 1.55. A 0.002 to 0.010 inch layer of transparent flexible abrasion resistant polymeric coating does not affect the path of normally incident incoming light beam. With such a coating alteration of the path of inclined incident light beam is minimal. Similarly, the reflected light beam path is not severely affected. The internal reflection property of the retroreflective elements is not deteriorated since the abrasion resistant coating has significantly lower refractive index, as compared to that of the retroreflective elements.

The leash comprises a cylindrical reflective braided sleeve having three or more narrow width reflective strips that are braided at a shallow cylindrical braid angle, said cylindrical reflective braided sleeve being operable to surround the central cylindrical braided rope core thereby providing omnidirectional reflectivity. Each narrow width reflective strip has a flexible nylon retroreflective sheet sewn to their show surface. The flexible nylon retroreflective sheet is formed by thermally bonding a retroreflector coated flexible polymer sheet to a nylon mesh strip.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

Figure 1A:
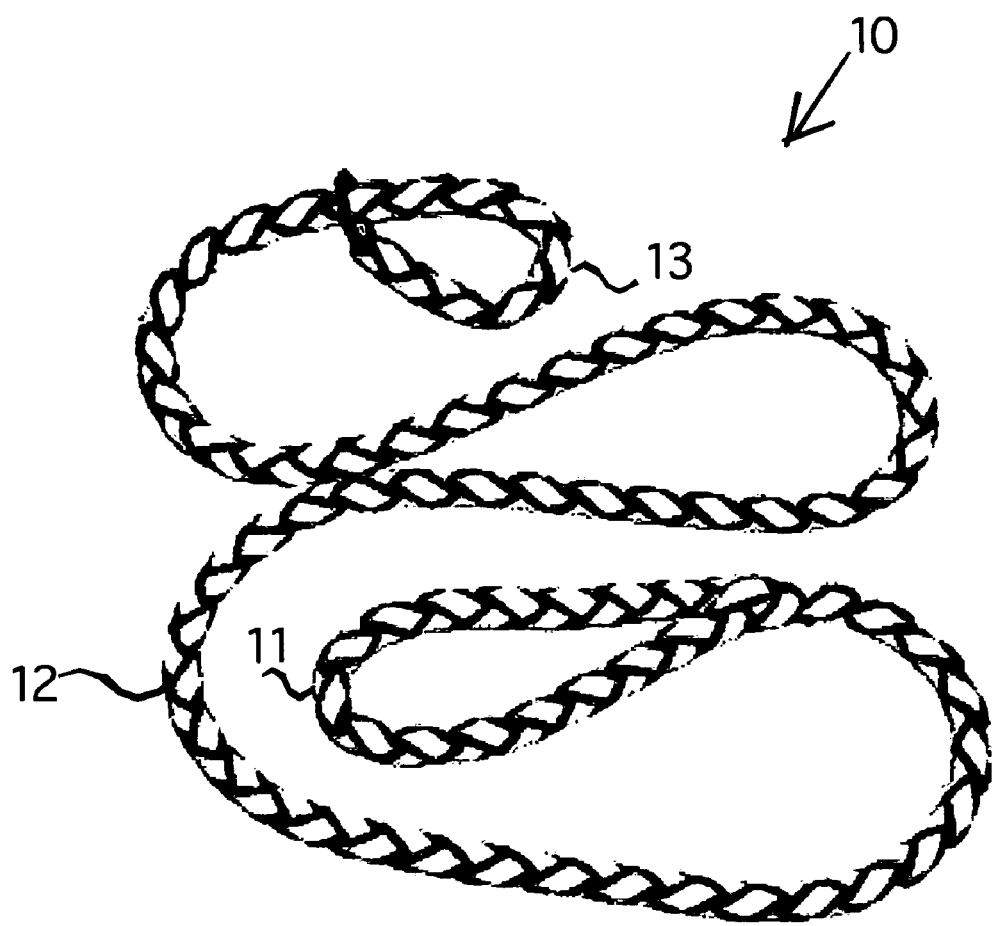
FIG. 1a is a photograph of the leash showing a leash with the reflective cylindrical braided sleeve of narrow width strips covering a central core forming a leash handle, pet leash central section, and choke collar section, taken with camera flash light showing reflective portions as bright regions.

The present invention provides an abrasion resistant pet leash that is flexible, twistable and omnidirectionally reflective. It has an integrally formed handle in the proximal end of the leash, which is also omnidirectionally reflective. The distal end of the pet leash has a ring that is integrally braided into the leash forming a choke pet collar. The handle, pet leash, and the choke collar of the pet leash are all omnidirectionally reflective reflecting incident light back to its source, thereby clearly defining the pet owner's hand that has the leash, the pet leash and the neck portion of the pet that carries the choke collar. This increases the margin of safety in dusk or night time environments when a car headlight can illuminate the owner walking a pet and the pet, reducing the possibility of accidents. Since the omnidirectionally reflecting pet leash reflects light over a broad range, due to its reflective cylindrical sleeve arrangement, the headlight can be at a significant angle and could still be reflected back.

The abrasion resistant omnidirectional pet leash is constructed by building a cylindrically reflective sleeve from narrow width strips of nylon or polypropylene. Reflectivity is achieved by first selecting a flexible polymer sheet and coating the flexible polymer sheet with a plurality of retroreflectors using a transparent binder to form a retroreflector coated flexible polymer sheet. The retroreflector coated flexible polymer sheet is then thermally bonded to a nylon mesh strip to form a flexible nylon retroreflective sheet. The flexible nylon retroreflective sheet is then sewn onto a show surface of a narrow width reflective strip. At least three of these narrow width reflective strips are braided at a shallow cylindrical braid angle to form an omnidirectionally reflective sleeve having a braided construction.

The retroreflecting elements may be corner cubes, in which case the polymeric flexible sheet can be non-reflective. Alternatively, the retroreflecting elements may be microspheres. If microspheres are used as retroreflective elements, the polymeric flexible sheet needs to be reflective and is typically metallized with aluminum or silver. In either case, the retroreflective elements are bonded to the flexible sheet using a transparent binder.

The flexible sheet with retroreflective elements is available from 3M Corporation. The trade name for this product is SCOTCHLITE and the flexible polymer is typically PVC. The product is available in a variety of sizes. The flexible reflectorized sheets may be delivered onto another material by way of utilizing transfer films. These transfer films are composed of retroreflector elements bonded to a variety of heat-activated adhesives. The retroreflector elements include wide angle, exposed retroreflective lenses bonded to a heat activated polyurethane adhesive. The reflective surface is protected by a white paper liner for ease in handling prior to lamination. A plastic liner protects the adhesive side and must be removed before lamination onto the nylon mesh strip. This flexible reflectorized sheet is thermally bonded to a nylon mesh strip, woven or knitted to form a flexible nylon retroreflective sheet.

The nylon mesh strip may have a width of 0.0165 cm to 0.635 cm (0.0065 inches to 0.25 inches) and is thermally bonded to a SCOTCHLITE strip having a width slightly less than the width of the nylon mesh strip. The SCOTCHLITE strip is bonded the entire length of the nylon mesh strip, and is bonded centrally on the nylon mesh strip, so that there are equal side portions of the nylon mesh strip on both sides of the SCOTCHLITE strip. The side portions are then sewn to a narrow width strip. The thermal bonding binder may be selected from a number of polymeric binders including, but not limited to, polyvinyl chloride, polyethylene, polyurethane, polyvinyl acetate or acrylates.

The SCOTCHLITE™ reflective material is composed of a wide angle, exposed retroreflective lenses bonded to a heat activated polyurethane adhesive. Alternately, the reflective material is composed of a wide angle, exposed retroreflective lenses bonded to bond to durable cloth backing comprised of 65% polyester, and 35% cotton, which is then treated with a polyurethane adhesive and thereby thermally bonded to a nylon mesh strip.

The SCOTCHLITE™ reflective material with the durable cloth backing is then thermally bonded onto a nylon mesh strip to form a flexible nylon retroreflective sheet. The flexible nylon retroreflective sheet is sewn onto a narrow width reflective strip by sewing using a lockstitch with no more than 12 stitches 2.54 cm (per 1 inch), and not less than 2 mm (5/64 inches) from the edge of the reflective fabric. The flexible nylon retroreflective sheet is highly flexible and can be cylindrically braided, for example, through the braiding of the narrow width strip to which it is attached via sewn to the surface thereof. At least three of these narrow width reflective strips are braided at a shallow cylindrical braid angle to form an omnidirectionally reflective sleeve having a braided construction surrounding a central rope core of the leash, which substantially sustains the pet pulling tensile forces.

The abrasion resistant omnidirectional pet leash is constructed by building a cylindrically reflective sleeve from the narrow width strips of nylon or polypropylene having the flexible nylon retroreflective sheets sewn thereto. The cylindrical braiding employs three or more narrow width strips. The cylindrical braiding is accomplished with a small angle between narrow width strips and the longitudinal direction of the central core rope. The proximal end of the central core of the leash is fashioned to form a loop representing a handle, and the distal end is formed to go through a metallic loop to create a choke leash. The cylindrical braiding is accomplished to cover the entire length of the pet leash, including the handle and the choke collar hardware. The ends of the braid are terminated by permanent bonding.

In an alternate embodiment, the portion of the pet leash near the distal end carries an adjustable metallic tab component having one or more apertures. The distal end of the leash carries a typical pet leash clamp, which engages with one or more apertures in the metallic tab. This construction provides pet collar having a non-choke function and omnidirectional reflectivity.

Reflective material is bonded to a heat activated adhesive to form a transfer film. Alternatively, reflective material may be comprised of glass beads, partially embedded in fabric and coated with a polymer matrix, while still providing exposure of the glass beads to promote optics to form a fabric. The fabric is metalized with silver for abrasion and for industrial use. The reflective material may be impregnated with aluminum, which stands up well to home washing and works well with abrasion protection. The fabric may be laminated with a polyester film (mesh) in back for sewing purposes, and further treated with a heat activated adhesive for thermally bonding to a surface. For example, SCOTCHLITE™ reflective material utilizing silver fabric metalized with aluminum may be utilized. The reflective material by SCOTCHLITE™ sold as transfer film 8710—silver transfer film or, alternatively, 8910 silver fabric, may be utilized. An example of a transfer film and a fabric commercial reflective material by SCOTCHLITE™ is illustrated below:

TABLE A

| Product Name | Daytime Color | Reflected Color | Abrasion |
|---|---|---|---|
| 8710 Silver Transfer Film | Silver | White | EN 530 Method 2/ 5000 cycles |
| 8910 Silver Fabric | Silver | White | EN 530 Method 2/ 5000 cycles |

* SCOTCHLITE ™ is certified to meet ANSI/ISEA 1-7-1999 Level 2 retroreflective performance and EN 471 Class 2 retroreflective performance.

A transparent abrasion resistant coating is applied to the outer surface of the cylindrically reflective braided sleeve of the pet leash and is applied as a substantially conformal coating. The reflective strips have retroreflective elements embedded in the strips having a corner cube prismatic or microsphere geometry. These transparent retroreflective elements are made from high refractive index transparent materials such as barium oxide-titanium oxide containing glasses. They exhibit a refractive index in the range of 1.9 to 2.2. The transparent abrasion resistant polymeric coating is selected to have a refractive index, which is significantly less than that of the retrorefractive elements. As a result, the incident and reflected light path is not significantly altered even when the incident beam is inclined to the reflective strips. The internal reflection process within the retroreflective elements is not deteriorated by the transparent abrasion resistant coating. The polymers suitable for use with the transparent abrasion resistant coating have a refractive index in the range of 1.3 to 1.55.

In addition to this refractive index requirement, the transparent abrasion resistant coating must exhibit excellent mechanical properties, including tensile strength and elongation, in order to provide the required abrasion resistance. The polymer coating must also exhibit superior bond properties to the retroreflective elements and the underlying polymeric sheet of the reflective strip. If the bond properties are poor, the transparent abrasion resistant coating may delaminate when the pet leash is subjected to abrasion or flexing and twisting movement. The transparent abrasion resistant coating must have low elastic modulus so that it remains flexible when the pet leash is twisted. A high modulus transparent abrasion resistant coating is not desired since it applies significant stresses at the coating—reflective tape interface resulting in deterioration or fracture of the retroreflective elements.

A number of polymer systems meet these requirements. These polymers may be applied by dipping the cylindrically braided pet leash in a polymeric melt or by spraying a polymer composition dissolved in a suitable solvent. Thermosetting resin compositions such as two-component polyurethane may be painted or sprayed over the cylindrically braided reflective outer surface of the pet leash. In Table B below there are listed a number of transparent polymer compositions suitable for the pet leash abrasion resistant coating. Also listed are the refractive indexes for the compositions.

TABLE B

| Polymer Name | Refractive Index |
|---|---|
| aliphatic thermoplastic polyurethanes | 1.35 to 1.45 |
| Dow Corning OE-4100 Silicone elastomer | 1.4751 |
| Polymethyl tetradecyl siloxane | 1.4550 |

TABLE B-continued

| Polymer Name | Refractive Index |
|---|---|
| Poly vinyl acetate | 1.4665 |
| PMMA Poly methyl methacrylate | 1.4893 |
| Cellulose acetate | 1.4750 |
| Ethylene/vinyl acetate copolymer EVA | 1.4820 |

Thermoplastic aliphatic thermoplastic polyurethanes are preferred as compared to aromatic urethanes because of their transparency, resistance to dirt build-up, flexiblility ultra-violet radiation degradation resistance. Typically, aliphatic polyurethane has the structure

[—O—(CH(CH$_3$)CH2O$_{20}$—C(O)—NH—R—NH—C(O)—]; or

[—O—(CH$_2$—CH$_2$CH$_2$ CH$_2$—O—)$_{10}$—C(O)—NH—R—NH—C(O)—], where R is a non-aromatic group.

Rohm and Haas, (Morton International Inc) supplies melt extrudable polyurethane compositions under the trade name designation MORTHANE L430.77 and MORTHANE Brand PN 3429-215. A melt extrusion process may be used to coat the external surface of the cylindrically braided reflective sleeve Aptec Laboratories, 28570, Livingston Avenue, Valencia Calif. 91355-4171. 661-257-1677 markets polyurethane with low elastic modulus for conformal coatings. Two component APTEK transparent unfilled polyurethane compositions of interest include the composition 2503-A/B (www.apteklabs.com/products/2503-AB.pdf) and the composition 2506-A/B (www.apteklabs.com/products/2506.pdf). These two compositions are designed for the encapsulation and protection of devices in applications that require toughness, excellent flexibility and optimum tensile strength, as well as elongation characteristics. APTEK 2503-A/B is curable at 80 C while APTEK 2506-A/B is room temperature curable. Both compositions are dissolved in a solvent and are therefore suitable for brush or spray application.

Bayer provides a number of clear polyurethane coating compositions based on one component or two component systems. Desmodular I aliphatic diisocyanate is often abbreviated to IPDI, CAS 4098-71-9. Polyurethane prepared from IPDI is clear, tough and resists photodegradation and hydrolysis. Isocyanurate based on IPDI is marketed by Bayer under the trade name Z-4470; and is available in a number of solvent blends. Two component polyurethane is commonly formulated with Desmodur Z-4470. Desmodur E polyisocyanates is a single component moisture curable system capable of being diluted in a solvent.

www.setcochemicals.net/resins4.htm discloses a flexible room temperature curing polyurethane coating designated ROTOTHANE® 9020. This coating adheres to plastics and leather.

Dow Corning supplies a number of silicone compositions suitable for coating the cylindrically braided reflective strips to provide abrasion resistance. Conformal coatings are materials applied in thin layers (typically a few mils or a fraction of a mm) onto printed circuits or other electronic substrates. They provide environmental and mechanical protection to significantly extend the life of the components and circuitry. Conformal coatings are traditionally applied by dipping, spraying or simple flow coating, and increasingly by select coating or robotic dispensing. Key requirements for the clear coating are low viscosity, enabling application of thin conformal coatings, room temperature cure in reasonable cure time and reasonable hardness. In Table C below there are shown some of the conformal silicone coatings marketed by Dow Corning.

TABLE C

| Product Name | One part/ Two part | Viscosity CPS | Cure | Durometer |
|---|---|---|---|---|
| 3-1965 | 1 | 110 | RT 24 Hrs Moisture cure | 29 A |
| 3-1953 | 1 | 360 | RT 24 Hrs Moisture Cure | 26 A |
| 3-1765 | 1 | 150 | RT 24 Hrs Moisture cure | 25 A |
| 3-1753 | 1 | 385 | RT 24 Hrs Moisture cure | 25 A |
| Sylgard 1-4128 | 2 | 450 | 20 min/85 C | 64 OO |
| I-4105 | 1 | 470 | 10 min/105 C | 65 OO |
| QI-4010 | 1 | 830 | 15 min/110 C | 30 A |
| I-2620 | 1 | 250 | RT 72 Hrs | 25 D Abrasion Resistant |
| I-2577 LOW VOC | 1 | 1250 | RT 72 Hrs | 25 D Abrasion Resistant |
| I-2577 | 1 | 725 | RT 72 Hrs | 23 D Abrasion Resistant |

Candidates for silicone conformal coating compositions that meet the low viscosity in the range of 100–250 CPS, room temperature cure in reasonable time period and reasonable hardness are coating compositions 3-1965, 3-1765 and I-2620. These compositions may be dipped, brush painted or sprayed.

Of particular interest is a Dow Corning OE-4100 optical silicone elastomer, which cures in 2 hour at 150 C with a platinum based catalyst, as discussed in www.dowcorning-.com/content/photonic/75-1009B-01.pdf. This composition is specifically developed for use in the optical coating of optical components and is clear, transparent with a refractive index of 1.47.

Polyvinyl acetate is soluble in acetone as well as toluene. Acetone dissolved polyvinyl acetate film has a slightly higher elastic modulus as compared to that dissolved in toluene due to rapid evaporation of acetone. Acetone dissolved polyvinyl acetate is applied to the cylindrically braided surface of the pet leash to form a flexible film which is resistant to twisting action of a pet leash. Polyvinyl acetate is available from Union Carbide under the trade names AYAC, AYAA, AYAF and AYAT depending upon the molecular weight of the polymer.

FIG. 1a is a photograph of the pet leash at 10 showing the handle section 11, the central pet leash section 12, and the choke collar section 13. A cylindrically braided sleeve, created from braided narrow width reflective strips, covers each of these sections (11, 12, and 13), providing substantially the entire surface of the leash with omnidirectional reflectivity. The leash completely reflects incident light in the same direction the light was emanated. Due to the cylindrical character of the reflective braided sleeve, some portion of the sleeve is always at normal orientation to the incoming light beam, that is, the direction at which the reflection from the retroreflective elements is maximized. Retroreflective elements reflect light over a large range of acceptance angles, but the reflection is at a lower intensity. This cylindrical construction effectively reflects the incoming camera flash light as shown in the photograph of FIG. 1a by the extremely bright appearance of the retroreflectors 16 (see also FIG. 2) of the leash.

Figure 1B:
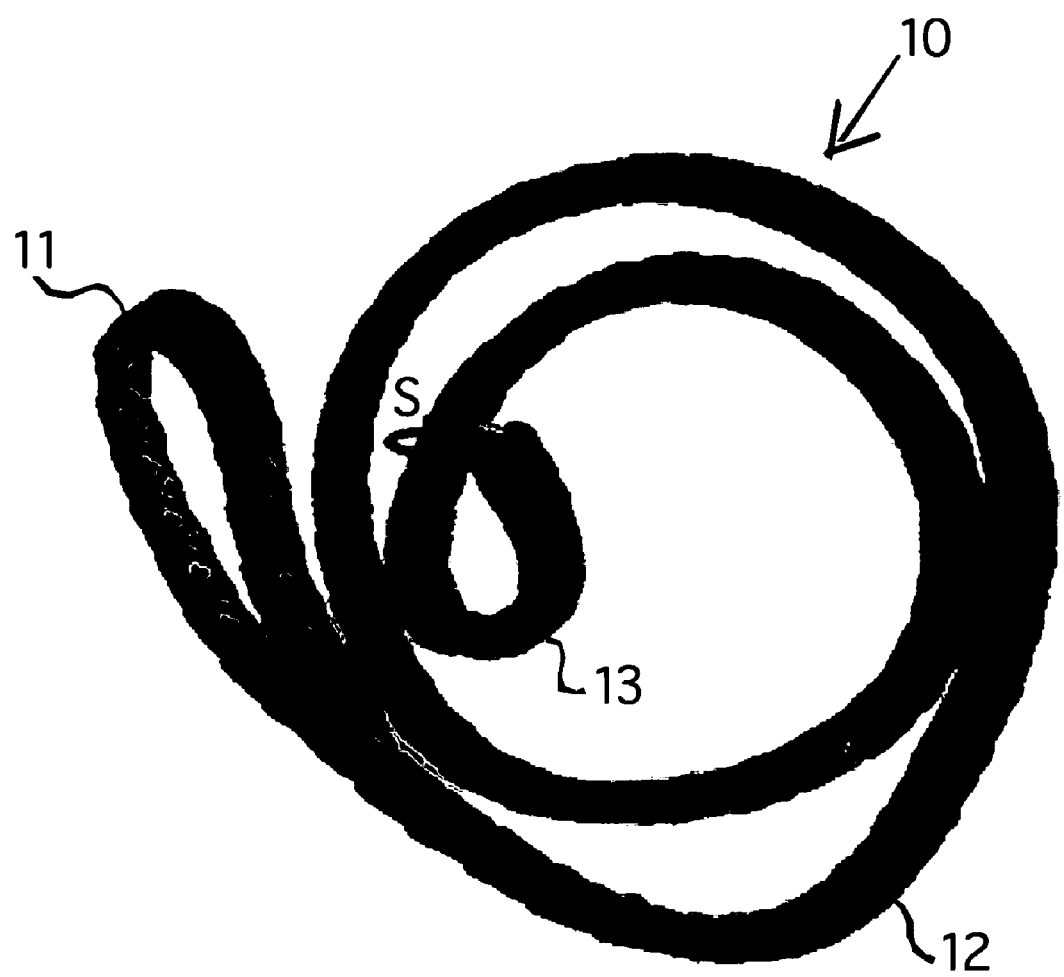
FIG. 1b is a photograph of the leash showing a leash with the cylindrical reflective braided sleeve of narrow width strips covering a central core forming a leash handle, pet leash central section and choke collar section, taken without camera flash light showing reflective portions as dark regions.

FIG. 1b shows a photograph of another view of the omnidirectional reflective pet leash without using a camera flash. The illumination comes from the room's light, as evidenced by the shadow, "S", of the metallic ring in FIG. 1b. The light here, again, is reflected back to the illuminating source, and practically no light is directed in the direction of the camera. As a result, the retroreflector bright areas of FIG. 1a now appear dark. The metallic ring can alternatively be replaced by a traditional clasp to attach to an omnidirectional reflective pet collar.

Figure 2:
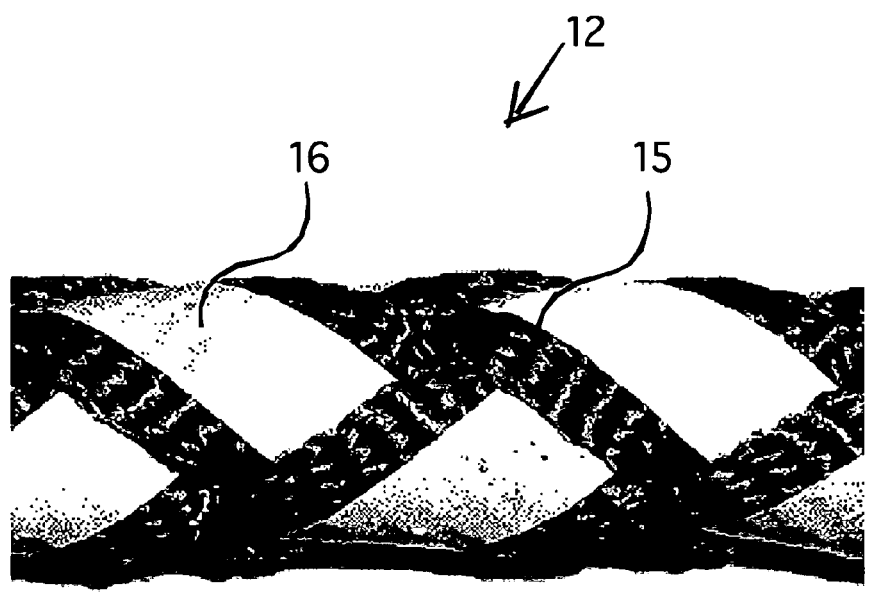
FIG. 2 is a photograph of the leash illustrating the details of a transparent abrasion resistant polymeric conformal coating substantially covering the reflective cylindrical braided sleeve of narrow width strips surrounding a central pet leash core and also schematically shows the construction of the narrow width reflective strips that are braided at a shallow cylindrical braid angle to form the omnidirectionally reflective sleeve.
Figure 2:
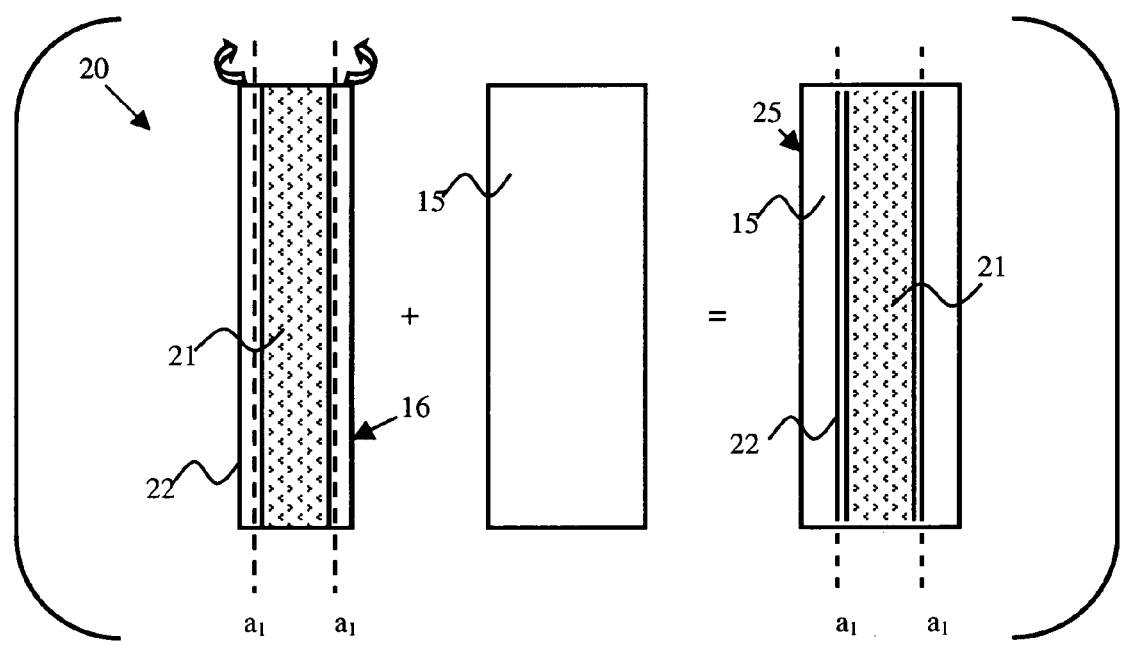

FIG. 2 is a photograph of a magnified portion of the central pet leash section 12. The photograph shows a transparent abrasion resistant polymeric conformal coating substantially covering the reflective cylindrical braided sleeve of narrow width strips surrounding a central pet leash core. The cylindrical reflective braided sleeve is braided with a small braid angle of 5 to 10 degrees between the narrow width strips surrounding the central cylindrical rope core of the leash. The central cylindrical rope core is completely covered by the cylindrical reflective braided sleeve and therefore is invisible in the photograph. The flexible nylon retroreflective sheet is shown at 16 and the narrow width strip is shown at 15. The flexible nylon retroreflective sheet 16 is sewn onto a show surface of the narrow width strip 15 prior to cylindrical braiding operation. The outer surface of the flexible nylon retroreflective sheet 16 and the narrow width strip is covered with a transparent conformal flexible abrasion resistant coating.

FIG. 2 also schematically shows the construction of the narrow width reflective strips that are braided at a shallow cylindrical braid angle to form the omnidirectionally reflective sleeve, generally shown at 20. A flexible retroreflective sheet 21 is thermally bonded onto a nylon mesh strip 22 to form a flexible nylon retroreflective sheet 16. The nylon mesh strip 22 is folded at phantom lines $a_1$ in the direction indicated by arrows. The flexible nylon retroreflective sheet 16, comprising flexible retroreflective sheet 21 thermally bonded onto nylon mesh strip 22, is then sewn onto a show surface of a narrow width strip 15 at or near $a_1$ to form a narrow width reflective strip 25. At least three of these narrow width reflective strips 25 are braided at a shallow cylindrical braid angle to form an omnidirectionally reflective sleeve having a braided construction that surrounds a central rope core and covers each of these sections (11, 12, and 13), providing substantially the entire surface of the leash with omnidirectional reflectivity.

Figure 3:
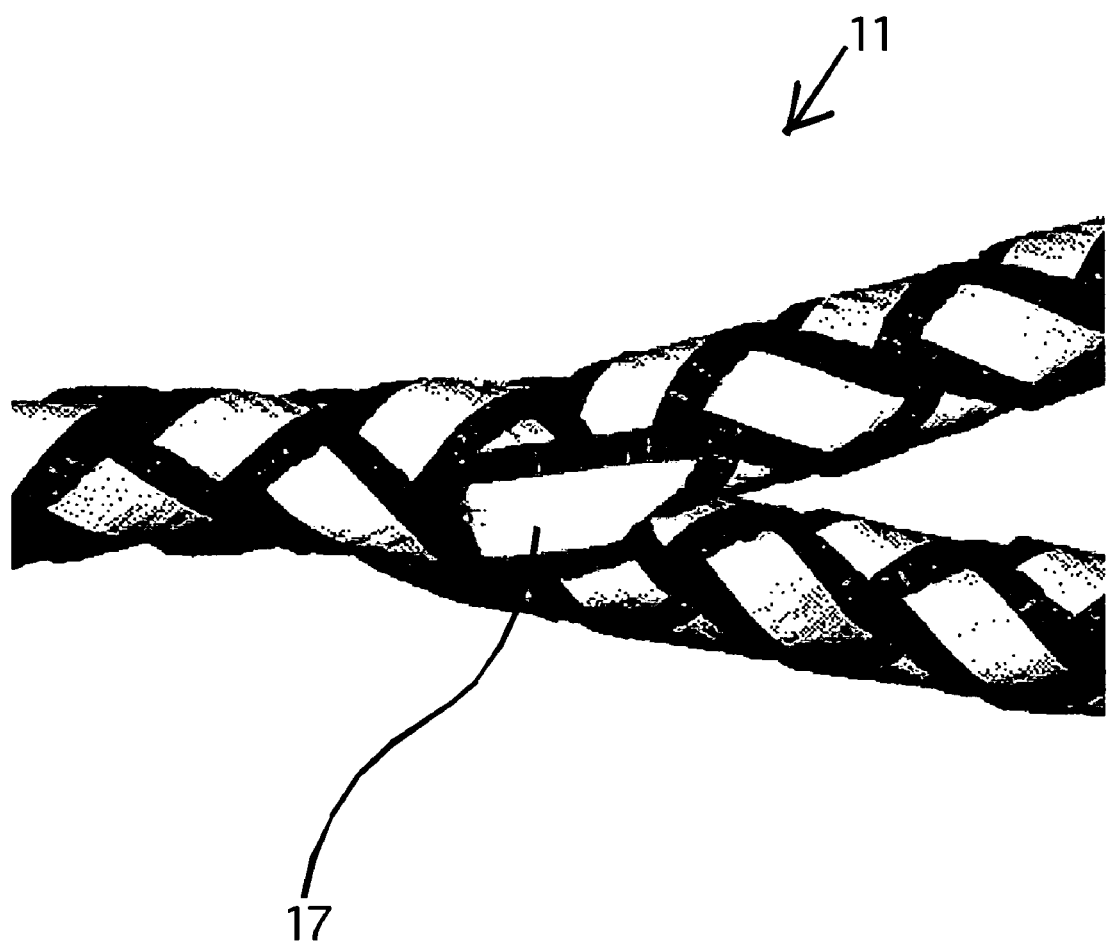
FIG. 3 is a photograph of the proximal end of the leash forming a loop that functions as a light reflecting handle with reflective cylindrical braided sleeve of narrow width strips.

FIG. 3 shows the details of the handle portion 11 of the omnidirectionally reflective pet leash. The loop of the central cylindrical braided rope core is completely covered by the cylindrical reflective braided sleeve and the ends of the braid are terminated by bonding to each strip at 17.

The key features of the abrasion resistant omnidirectionally reflective pet leash includes, in combination, the features set forth below:

1. a pet leash comprised of a central cylindrical braided rope core composed of braided nylon or polypropylene fibers capable of sustaining tensile forces developed by pet leash loads;
2. the central cylindrical braided rope core being covered substantially with a transparent abrasion resistant conformal coating applied to a cylindrically reflective braided sleeve;
3. the cylindrically reflective braided sleeve formed by cylindrically braiding narrow width reflected strips, formed from knitted, woven or braided nylon, or polypropylene narrow width strips, having a flexible nylon retroreflective sheet, comprising a flexible retroreflective sheet thermally bonded onto a nylon mesh strip, sewn to the surface thereof;
4. each of the flexible retroreflector sheets being prepared by bonding corner cube geometry retroreflectors to a flexible polymeric sheet using a transparent binder;
5. such flexible retroreflector sheets alternately being prepared by bonding microsphere geometry retroreflectors to a metallized reflective flexible polymeric sheet using a transparent binder;
6. each of the flexible retroreflective sheets being thermally bonded to a nylon mesh strip to form a flexible nylon retroreflective sheet;
7. twist and flexure forces acting on the abrasion resistant omnidirectionally reflective pet leash being accommodated by the braided construction of the cylindrical reflective sleeve and the flexibility of abrasion resistant coating;
8. the cylindrical braided sleeve-covered pet leash substantially reflecting incident light back in the same direction as the incident light, clearly indicating the whereabouts of the pet leash handle, pet leash central portion, and the pet leash collar surrounding the neck; and
9. the abrasion resistant omnidirectionally reflective pet leash providing an increased margin of safety for pets and their owners while walking in dimly lit environments, such as parking garages, or inclement weather conditions, where rapidly moving vehicles are encountered.

The abrasion resistant omnidirectionally reflective pet leash disclosed herein can be modified in numerous ways without departing from the scope of the invention. For example, at least one strip of the central braded rope core can be composed of leather. The pet collar can be integral with the central rope core or detachable therefrom via fastening means in the conventional way. These and other modifications are intended to fall within the scope of the invention, as defined by the subjoined claims.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:
1. A reflective pet leash, comprising:
 a. a central cylindrical braided rope core operable to sustain substantial tensile forces;
 b. a cylindrical reflective braided sleeve comprising three or more narrow width reflective strips that are braided at a shallow cylindrical braid angle, said cylindrical reflective braided sleeve being operable to surround said central cylindrical braided rope core thereby providing omnidirectional reflectivity;
 c. said cylindrical reflective braided sleeve substantially coated with a conformal transparent polymeric abrasion resistant coating;
 d. said narrow width reflective strips comprising a woven or knitted narrow width strip and a flexible nylon retroreflective sheet sewn thereon, said woven or knitted narrow width strip having a show surface, said flexible retroreflective nylon sheet comprising a flexible retroreflective sheet thermally bonded onto a nylon mesh strip, said nylon mesh strip being sewn onto said show surface of said narrow width reflective strip;
 e. said flexible retroreflective sheet having retroreflectors bonded thereto with a transparent bond layer;
 f. said transparent polymeric abrasion resistant coating having a refractive index lower than that of said retroreflectors; and g. said leash having a proximal end and a distal end, the proximal end being looped and braided to form an omnidirectionally reflective handle, and the distal end being looped and braided and attached to a metallic hardware component operable with said rope core and surrounding braided sleeve to form a pet collar having omnidirectional reflectivity.

2. A reflective pet leash as recited by claim 1, wherein said central cylindrical braided rope core comprises braided nylon fibers.

3. A reflective pet leash as recited by claim 1, wherein said central cylindrical braided rope core comprises braided polypropylene fibers.

4. A reflective pet leash as recited by claim 1, wherein said cylindrical reflective braided sleeve is braided at a braid angle of 5 to 10 degrees.

5. A reflective pet leash as recited by claim 1, wherein each of said narrow width reflective strips has a width of 0.0065 to 0.25 inches.

6. A reflective pet leash as recited by claim 1, wherein said flexible retroreflective sheet is thermally bonded to said nylon mesh strip with polyvinyl chloride.

7. A reflective pet leash as recited by claim 1, wherein said flexible retroreflective sheet is thermally bonded to said nylon mesh strip with polyvinyl acetate.

8. A reflective pet leash as recited by claim 1, wherein said flexible retroreflective sheet is thermally bonded to said nylon mesh strip with polyurethane.

9. A reflective pet leash as recited by claim 1, wherein said flexible retroreflective sheet comprises a plurality of corner cube retroreflectors.

10. A reflective pet leash as recited by claim 1, wherein said flexible retroreflective sheet comprises a plurality of microsphere retroreflectors bonded to a light-reflecting sheet.

11. A reflective pet leash as recited by claim 1, wherein said flexible retroreflective sheet comprises a plurality of wide angle, exposed retroreflective lenses bonded to a heat activated polyurethane adhesive.

12. A reflective pet leash as recited by claim 1, wherein said flexible retroreflective sheet comprises a plurality of wide angle, exposed retroreflective lenses bonded to a durable cloth backing.

13. A reflective pet leash as recited by claim 1, wherein said retroreflectors have a refractive index in the range of 1.9 to 2.2.

14. A reflective pet leash as recited by claim 1, wherein said transparent polymeric abrasion resistant coating has a refractive index in the range of 1.3 to 1.55.

15. A reflective pet leash as recited by claim 1, wherein said transparent polymeric abrasion resistant coating has a thickness in the range of 0.002 to 0.010 inches.

16. A reflective pet leash as recited by claim 1, wherein said transparent polymeric abrasion resistant coating polymer is a member selected from the group consisting of polyurethane, silicone, polymethyl methacralate, and polyvinyl acetate.

17. A reflective pet leash as recited by claim 16, wherein said polyurethane is aliphatic polyurethane.

18. A reflective pet leash as recited by claim 16, wherein said polyurethane is melt extruded.

19. A reflective pet leash as recited by claim 16, wherein said polyurethane is dissolved in a solvent and sprayed on the said cylindrical reflective braided sleeve.

20. A reflective pet leash as recited by claim 16, wherein said silicone comprises a silicone composition having a viscosity in the range of 100–275 CPS.

21. A reflective pet leash as recited by claim 1, wherein said pet collar functions as a choke collar.

22. A reflective pet leash as recited by claim 1, wherein said metallic hardware component comprises an adjustable metallic tab having a plurality of apertures connected to a pet leash clamp thereby forming a pet collar having non-choke functionality and omnidirectional reflectivity.

23. A reflective pet leash, comprising:
  a. a central cylindrical braided rope core operable to sustain substantial tensile forces;
  b. a cylindrical reflective braided sleeve comprising three or more narrow width reflective strips that are braided at a shallow cylindrical braid angle, said cylindrical reflective braided sleeve being operable to surround said central cylindrical braided rope core thereby providing omnidirectional reflectivity;
  c. said narrow width reflective strips comprising a woven or knitted narrow width strip and a flexible nylon retroreflective sheet sewn thereon, said woven or knitted narrow width strip having a show surface, said flexible retroreflective nylon sheet comprising a flexible retroreflective sheet thermally bonded onto a nylon mesh strip, said nylon mesh strip being sewn onto said show surface of said narrow width reflective strip;
  d. said flexible retroreflective sheet having retroreflectors bonded thereto with a transparent bond layer; and
  e. said leash having a proximal end and a distal end, the proximal end being looped and braided to form an omnidirectionally reflective handle, and the distal end being looped and braided and attached to a metallic hardware component operable with said rope core and surrounding braided sleeve to form a pet collar having omnidirectional reflectivity.

24. A process for manufacture of a reflective pet leash, comprising the steps of:
  a. selecting a braided nylon or polypropylene cylindrical central rope, said cylindrical central rope having a proximal end, a distal end, and an external surface;
  b. forming a loop at said proximal end of said central rope, to thereby form a handle;
  c. attaching said distal end to a mechanical hardware component, said mechanical hardware component operating with said central rope to form a pet collar;
  d. selecting a flexible polymer sheet;
  e. coating said flexible polymer sheet with a plurality of retroreflectors using a transparent binder to form a retroreflector coated flexible polymer sheet;
  f. thermally bonding said retroreflector coated flexible polymer sheet to a nylon mesh strip to form a flexible nylon retroreflective sheet;
  g. sewing said flexible nylon retroreflective sheet to a narrow width reflective strip;
  h. braiding at least three of said narrow width reflective strips at a shallow cylindrical braid angle to form an omnidirectionally reflective sleeve having a braided construction;
  i. applying a transparent flexible polymeric abrasion resistant conformal coating to substantially cover said omnidirectionally reflective sleeve; and
  j. covering said handle, said pet collar, and said external surface of said cylindrical central rope with said omnidirectionally reflective sleeve to said pet leash with omnidirectional reflectivity;

said omnidirectionally reflective pet leash being operable to sustain abrasion, substantial tensile forces, and to accommodate twist and flexure forces due to strength and movement afforded by said braided construction of said omnidirectionally reflective sleeve.

* * * * *